US008175040B2

(12) United States Patent
Demirhan et al.

(10) Patent No.: US 8,175,040 B2
(45) Date of Patent: May 8, 2012

(54) RANDOM ACCESS REQUEST EXTENSION FOR AN ADDITIONAL RESOURCE REQUEST

(75) Inventors: Mustafa Demirhan, Hillsboro, OR (US); Ali Taha Koc, Hillsboro, OR (US); Shweta Shrivastava, Beaverton, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 961 days.

(21) Appl. No.: 11/764,734

(22) Filed: Jun. 18, 2007

(65) Prior Publication Data

US 2007/0291719 A1 Dec. 20, 2007

Related U.S. Application Data

(60) Provisional application No. 60/815,288, filed on Jun. 20, 2006.

(51) Int. Cl.
*H04M 5/00* (2006.01)
*H04M 7/00* (2006.01)
*H04M 1/00* (2006.01)
*H04W 4/00* (2009.01)
*H04W 72/00* (2009.01)
*H04B 7/00* (2006.01)
*H04J 3/06* (2006.01)

(52) U.S. Cl. ........ 370/329; 370/348; 370/349; 370/328; 370/338; 370/350; 455/435.1; 455/450; 455/515; 455/517; 455/434

(58) Field of Classification Search .......... 455/450, 455/452.1, 515, 517, 434, 435.1; 370/329, 370/324, 349, 350, 328, 338, 335, 348
See application file for complete search history.

(56) References Cited

U.S. PATENT DOCUMENTS

| 6,259,724 | B1 | 7/2001 | Esmailzadeh | |
|---|---|---|---|---|
| 6,366,761 | B1 * | 4/2002 | Montpetit | ............. 455/12.1 |
| 6,708,037 | B1 | 3/2004 | Moulsley et al. | |
| 6,925,561 | B1 | 8/2005 | Hunt et al. | |
| 2004/0147274 | A1 * | 7/2004 | Khawand et al. | .............. 455/522 |
| 2004/0157602 | A1 * | 8/2004 | Khawand | ........................ 455/434 |
| 2005/0220034 | A1 * | 10/2005 | Zaniolo et al. | .............. 370/252 |
| 2007/0133458 | A1 * | 6/2007 | Chandra et al. | .............. 370/329 |
| 2007/0183361 | A1 * | 8/2007 | Damnjanovic et al. | ....... 370/328 |
| 2008/0318567 | A1 * | 12/2008 | Popovic et al. | ............ 455/422.1 |

OTHER PUBLICATIONS

Int'l Preliminary Report on Patenability for Int'l Application No. PCT/US2007/070943 mailed Jan. 8, 2009.
International Application No. PCT/US2007/070943 Int'l Search Report & Written Opinion dated Nov. 21, 2007, 11 pages.

* cited by examiner

*Primary Examiner* — Wesley Kim
(74) *Attorney, Agent, or Firm* — Blakely, Sokoloff, Taylor & Zafman LLP

(57) ABSTRACT

Methods and apparatuses enable sending a fast access request in a preamble of a random access request. The fast access request provides for an uplink assignment having bandwidth sufficient to allow the transmission of data with a scheduling request. The fast access request can indicate, for example, a traffic class of a message to be sent. Based on traffic class information, up to a certain additional amount of bandwidth can be allocated for a scheduling procedure for the requesting user device.

19 Claims, 5 Drawing Sheets

| EXT RQST 310 | BYTES 320 | CLASS 330 | EXAMPLE 340 | CHARACTERISTIC 350 |
|---|---|---|---|---|
| 11 | 512 | CONVERSATIONAL (REAL-TIME) 332 | VOICE 342 | PRESERVE TIME RELATION BETWEEN ENTITIES; CONVERSATIONAL (STRINGENT AND LOW DELAY) |
| 10 | 80 | STREAMING (REAL-TIME) 334 | STREAMING VIDEO 344 | PRESERVE TIME RELATION BETWEEN ENTITIES |
| 01 | 20 | INTERACTIVE (BEST EFFORT) 336 | WEB BROWSING 346 | REQUEST RESPONSE PATTERN; PRESERVE PAYLOAD CONTENT |
| 00 | 0 | BACKGROUND (BEST EFFORT) 338 | BACKGROUND EMAIL DOWNLOAD 348 | NO TIME EXPECTATION; PRESERVE PAYLOAD CONTENT |

RANDOM ACCESS REQUEST EXTENSION FOR AN ADDITIONAL RESOURCE REQUEST

This U.S. application claims priority to Provisional Application No. 60/815,288, filed on Jun. 20, 2006.

FIELD

Embodiments of the invention relate to wireless random access requests in wireless communication systems, and more particularly to an extension of a random access request for additional request resources.

BACKGROUND

In wireless communication systems, user equipment (also referred to as a user device or a client device) requests an access or scheduling assignment from an access point or base station. Many systems employ random access techniques to exchange messages related to a user equipment scheduling resource assignment, and to exchange messages related to an uplink assignment. Random access refers to a channel or a wireless resource that is not reserved for any one user equipment. Rather, multiple user equipment devices within a system can access the random access channel for exchanges related to resource assignment over which data access will be granted.

Traditional random access exchanges require two full round-trip periods before bandwidth for data transfer is allocated to the user equipment. The random access channels are expensive to use, at least because there is significantly limited bandwidth to service a number of users. The traditional random access exchange approach results in system delays, and delays in the user equipment transmitting data.

One approach to deal with random access delay involves piggybacking data on the preamble message that requests the scheduling resource. However, inclusion of data on the preamble message significantly increases bandwidth usage, which may result in unacceptable bandwidth usage levels, given the limitations in the random access channel.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 3 is a block diagram of an embodiment of a scheduling resource allocation lookup table.

Figure 1:
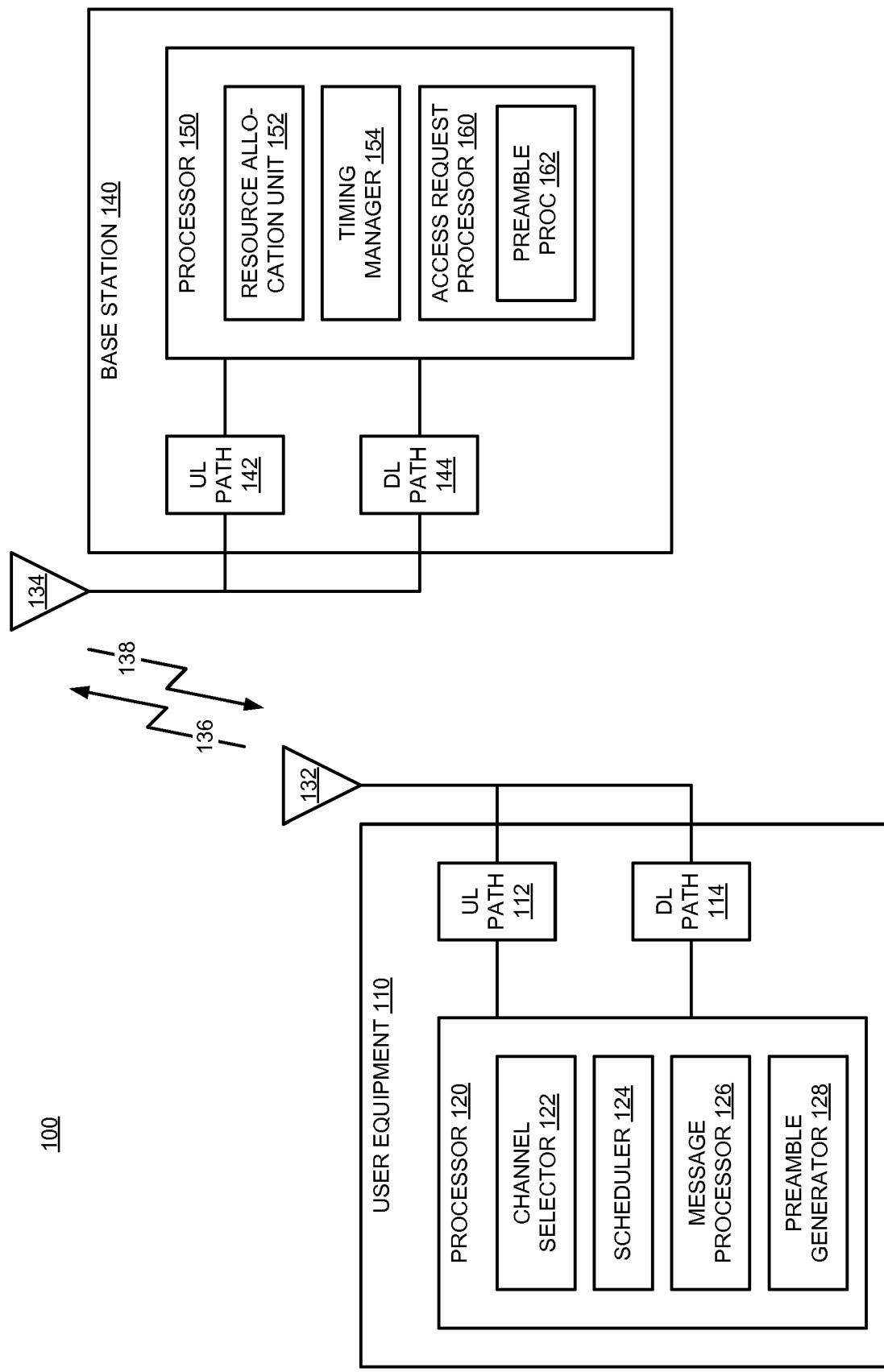
FIG. 1 is a block diagram of an embodiment of a system having user equipment that transmits a random access request with an extension to a base station that allocates resources based on the request.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Methods and apparatuses enable providing an extension in a random access request message that may trigger an allocation of additional scheduling resources. The extension, for example, could be additional information placed in the preamble of the random access request. Rather than being message data, the extension can be an additional field in the preamble to indicate one or more details related to the message. In one embodiment, the client device generates an access request message that includes a preamble extension requesting additional bandwidth for a scheduling procedure. Instead of simply requesting that the client device and the access point engage in the scheduling procedure, the client device can provide information that may affect what resources are allocated for the scheduling procedure.

As a result of the access request extension, the wireless system may have a reduced latency in the scheduling procedure. For example, client or message configuration or classification information can be provided to the access point. In one embodiment, the extension provides traffic class information for the message intended to be sent. In alternate embodiments, other information (e.g., priority class, relevant QoS, etc.) could be indicated in the preamble extension. Including the traffic class information in the preamble allows or triggers the access point (which may also be referred to as an eNodeB or base station) to make uplink (UL) allocations for the client device in response to the extended request. As used herein, an access request message with an allocation request extension may be referred to as an extended request.

Common wireless communication system standards include 3GPP LTE and WiMax. The extended request as described herein could be applied in either case, and may be applicable to other standards as well. As used herein, 3GPP LTE refers to any 3rd Generation Partnership Project (3GPP) Long Term Evolution (LTE) (3GPP Release 7, expected mid 2007, and other releases expected after 2007). 3GPP is also understood to incorporate the latest standards for Global System for Mobile communications (GSM) (the latest release as of the filing of this application being GSM-Rel-8, Apr. 19, 2007). As used herein, WiMax refers to Institute of Electrical and Electronics Engineers (IEEE) 802.16e-2005. As used herein, 3GPP or WiMax refer to the specific standards, or standards or implementations that are compatible with the standards (e.g., variations of the standards, proprietary implementations, etc.).

A discussion of 3GPP LTE follows as an example, and should be understood as illustrative, and not limiting. UL transmissions in 3GPP LTE are ideally inter-user orthogonal. A straightforward manner to achieve inter-user orthogonality is to require in the system that UL transmissions be synchronized and scheduled. However, in order to make sure that UL transmissions be synchronized and scheduled, a user equipment (UE) needs an access resource assignment. Non-orthogonal techniques (random access procedures) are employed in the 3GPP system to synchronize and schedule UL resources for the UEs. In contrast to legacy systems, in LTE there are no dedicated channels assigned. Thus, random access procedures are used for synchronization and UL scheduling request. The random access channel is typically implemented with spread coding, which significantly increases the resource requirements for transmission on the random access channel.

3GPP LTE defines the latency requirements for state transition from idle to active as 100 ms. The state transition includes the synchronization and UL scheduling grants and other signaling. The current two-part random access procedure increases the total latency for synchronization and UL scheduling. Note that the one-part data/bandwidth request piggybacking proposal, which suggests including data or bandwidth requests with the preamble, is very expensive to implement. As described herein with the extended request, an initial random access request can be small and still improve performance of the system with respect to synchronization and scheduling.

In one embodiment, the preamble extension includes 1-3 bits added to the preamble to specify traffic class information for the message. The size of the information can be modified to meet the desired granularity for the given implementation (e.g., more bits would allow more levels of distinction; however, more bits increases bandwidth usage). As mentioned above, information other than traffic class can be indicated. Whatever information is provided in the extension, the access point is able to determine some information about the incoming request, and provide an allocation according to the information provided in the extended request. In one embodiment, in response to receiving the allocation from the access point, the UE (which may also be referred to as a client device, user device, user terminal, etc.) receives the allocation, and sends the actual scheduling request and data at the same time.

Rather than piggybacking data on to the initial request, the UE can receive an assignment for an amount of data to be sent, according to what resources are available in the system. Then data can be included within the second part where the scheduling request is made, according to the scheduling allocation. That is, the access point may allocate some or no additional bandwidth. When additional scheduling resources are allocated, the data is able to be sent because with the provided additional bandwidth on the scheduling request resource. Thus, rather than having the traditional two-part approach to scheduling requests where data is sent on a third round-trip of message exchanges, the access point can determine whether the addition of the additional bandwidth request allows the UE (user equipment, also referred to as a user device) to start the data traffic one round trip time earlier than the traditional procedure.

As mentioned above, a preamble extension on the access request could indicate a traffic classification. Current UMTS (Universal Mobile Telecommunication System) defines four traffic classes: conversational class, streaming class, interactive class, and background class. Implementing the extended request message with UMTS allows selection of bandwidth assignments based on the traffic class. Any of the four traffic classes could be indicated by two additional bits in the preamble (e.g., through the use of a lookup table (LUT) with the two bits indexing the LUT to map a bit pattern to one of the four classes). Thus, traffic class information for UMTS can be indicated with two bits in the preamble.

As mentioned above, providing the preamble extension can decrease the data transmission latency by one round trip time compared to traditional bandwidth request procedures. In one embodiment, the extended request can be referred to as a "fast access request" procedure. Instead of strictly implementing the traditional two-part bandwidth request procedure, the access point can allocate a fixed amount of bandwidth to the UE for data transmission on the second part, if there are available UL slots. The amount of additional bandwidth is implementation specific, and one example implementation is illustrated below.

FIG. 1 is a block diagram of an embodiment of a system having user equipment that transmits a random access request with an extension to a base station that allocates resources based on the request. System 100 includes user equipment (UE) 110, which can be in wireless communication with base station 140, which represents any type of wireless access point. UE 110 includes an uplink (UL) path 112 and a downlink (DL) path 114. UL path 112 represents transmit capability of UE 110, which enables UE 110 to communicate on a UL channel with base station 140. Similarly, DL path 114 represents receive capability of UE 110, which enables UE 110 to receive messages from base station 140. UL path 112 and DL path 114 may include any of a number of components, including processors, filters, signal generators, etc., as is known in the art. In one embodiment, both UL path 112 and DL path 114 are coupled to the same transceiving antenna 132, although such is a requirement. Different antenna elements could be used to transmit and receive. Antenna 132 can be any of a number of known antennas, including dipole, directional, smart antenna, etc.

UE 110 also includes processor 120, which represents one or more processing devices. As is understood, UE 110 can include different receive and transmit signal processors, a baseband processor, etc., whether single or multiple core processors. In one embodiment, processor 120 includes certain components (e.g., if processor 120 is composed of multiple physical devices) that enable functionality for generating an access request message with an extended preamble. In another embodiment, processor 120 is coupled to such components. In another embodiment, the components represent components of processor 120 (e.g., processing elements of a field- or gate-programmable device, logic modules implemented as hardware or software logic, etc.).

In one embodiment, processor 120 includes channel selector 122, which enables UE 110 to select a channel on which to communicate (either transmit or receive). The channel can be a random access channel on which the extended request described herein can be transmitted. UE 110 is able to tune to, lock timing, etc., to a channel via channel selector 122. Channel selector 122 also allows UE 110 to access and transmit on a channel assigned by base station 140.

Scheduler 124 represents one or more components that enable UE 110 to determine or detect timing information and/or frequency information for knowing what channel or slot is available for communication to the base station. In one embodiment, scheduler 124 represents components that generate information that can affect a scheduling allocation assigned from base station 140. For example, scheduler 124 may determine class information for a message to transmit, or other configuration information related to the UE or a message to be sent.

Message processor 126 may refer to either or both of an incoming message processor or an outgoing message processor. An incoming message processor can identify what additional bandwidth, if any, has been allocated for a scheduling process. If additional bandwidth is allocated, message processor 126 as an outgoing message processor includes message data up to the amount allocated by the base station. In certain cases the message may be small enough to send the entire message in the bandwidth allocated for the scheduling exchange. In some cases, an amount of additional bandwidth will be allocated, but it will be less than what is requested with the preamble extension. Thus, message processor 126 as an outgoing message processor prepares a message in response to the assignment received.

Preamble generator 128 represents one or more components that can operate in conjunction with scheduler 124 to generate a preamble request in accordance with an amount of bandwidth desired. In one embodiment, preamble generator 128 is a sub-component of message processor 126, which may generate access request messages including a preamble extension for additional bandwidth in the scheduling request. Preamble generator 128 can include a lookup table (LUT) or other mechanism to determine what information to include for a preamble extension. Preamble generator 128 may include a traffic class or configuration identifier (not shown) that identifies, for example, what class of traffic is associated with a particular message. According to the identified traffic class, preamble generator 128 can then generate the proper preamble extension to be included in the access request message.

Base station 140 includes UL path 142 and DL path 144, similar to the components of UE 110. As with the components of UE 110, UL path 142 and DL path 144 can be the same path, or separate paths. The paths can be the same physical paths (e.g., the same components) with different processor techniques, etc. UL path 142 and DL path 144 are coupled to antenna 134, which represents any type of antenna, including broadcast, directional, smart, multi-element, diversity, etc. Transmission 136 represents UL communication sent from UE 110 to base station 140, and transmission 138 represents DL communication sent from base station 140 to UE 110.

Base station 140 includes one or more processing devices, which may include signal processors, digital signal processors (DSP), baseband processors, application specific integrated circuits (ASICs), etc. Processor 150 represents processing device(s) used by base station 140 to communicate with UE 110. In one embodiment, processor 150 includes certain components (e.g., if processor 150 is composed of multiple physical devices) that enable functionality for allocating scheduling assignments, including in response to access requests with extended preambles. In another embodiment, processor 150 is coupled to such functional components. In another embodiment, the components represent components of processor 150 (e.g., processing elements of a field- or gate-programmable device, logic modules implemented as hardware or software logic, etc.).

As illustrated, processor 150 includes resource allocation unit 152, timing manager 154, access request processor 160, and preamble processor (proc) 162. Resource allocation unit 152 represents components that identify available resources and allocate the resources to client devices communicatively coupled to the base station. In one embodiment, in response to an extended access request, resource allocation unit 152 determines what resources are available in the system, and determines whether resources can be allocated as requested. Part of determine whether resource can be allocated may include determining a load on the resources. In one embodiment, resource allocation unit 152 determines what resources are available, and assigns additional resources to the requesting UE, albeit the assigned additional resources may be less than what is requested.

Timing manager 154 enables base station 140 to generate synchronization information for UE 110, for example, for channel assignments. Timing manager 154 manages timing and/or frequency information that implements the allocations generated by resource allocation unit 152. Thus, timing and frequency resources can be provided in the system to generate the resource allocations within the system.

Access request processor 160 can influence resource allocations by resource allocation unit 152. As suggested above, resource allocation unit 152 can allocate additional resources based on extended preambles received by the base station. Access request processor 160 represents components that receive and service the access requests. Receiving and processing the access requests can include identifying a preamble extension. Preamble processor 162 can parse a message preamble to determine what information is present in the preamble. Preamble processor 162 can specifically determine what value is included in a preamble extension field. In one embodiment, preamble processor 162 can interpret both extended and non-extended preambles. For example, the access request size can be defined as variable, which can be parsed based on expecting certain fields, and having a checksum or other check mechanism.

When base station 140 receives a preamble with the fast access request, processor 150, either through the above components or through others not shown, determines what resources can be allocated. Processor 150 may grant requested resources based on the availability of resources and/or a scheduler policy. In one embodiment, if a particular request cannot be granted, a next-available fast access request is allocated. In another embodiment, base station 140 delays responding to the request until the resources are available. When UE 110 receives the allocation from base station 140, UE 110 sends the remaining scheduling request, if any, along with the data in the assigned resource blocks. This way, UE 110 can start the data transmission at least one round trip time earlier.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 2:
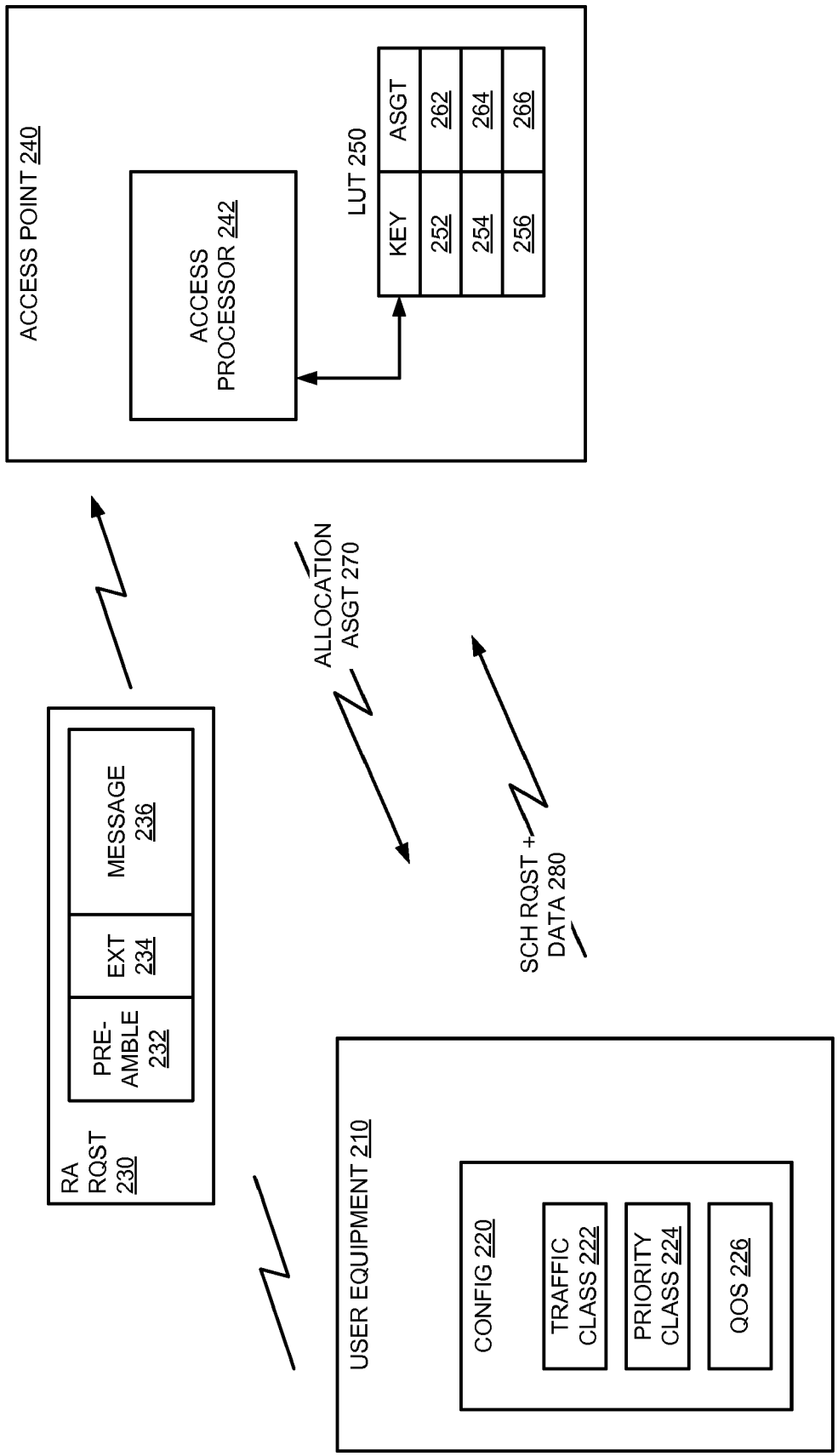
FIG. 2 is a block diagram of an embodiment of a system illustrating a random access request sent from user equipment to an access point.

FIG. 2 is a block diagram of an embodiment of a system illustrating a random access request sent from user equipment to an access point. System 200 can be a system according to that of FIG. 1, and according to any implementations described herein. UE 210 is a client device, and access point 240 is an access point or base station via which the client device accesses the communication system/network.

In one embodiment, UE 210 includes one or more elements of data that may collectively be referred to as configuration (config) data, as represented by configuration 220. Configuration 220 is not necessarily static, and indeed can be different for different messages to be sent from UE 210. Thus, in one embodiment, configuration 220 will include a combination of static and dynamic items. Configuration information can be stored in a memory or possibly (for static information) a storage device. Although several items of data are illustrated, an implementation of a system may include any one or more items. For example, configuration 220 may include one or more of traffic class 222, priority class 224, and QoS (quality of service) 226. Other configuration data items are possible.

Traffic class 222 is illustrated in a more detailed example with respect to FIG. 3. Essentially, traffic class 222 can be information that indicates a particular message belongs to one of several different traffic classes. Such classes may have an associated set of expectations about the type of traffic, and the level of service to be used to process the traffic. For example, different processing algorithms may be employed with different traffic classes. Priority class 224 may indicate similar information as traffic class 222, except indicating a priority of a message or a UE, instead of a class of traffic to which a message belongs. Priority traffic and priority processing can be performed with any of a number of techniques as understood in the art. QoS 226 can indicate a QoS for a particular UE and/or particular message, which may be negotiated with the base station. QoS 226 may indicate delay parameters, bandwidth requirements, etc., applicable to a particular UE or message. Thus, extended requests can actually be very useful in fulfilling QoS requirements at least by providing additional bandwidth one round trip time sooner than conventional methods allow.

UE 210 may generate a random access request as represented by RA (random access) request 230. RA request 230 includes preamble information 232, preamble extension (ext) 234, and message body 236. In one embodiment, preamble information 232 and message body 236 are unaffected by the teachings herein. However, they could also be modified from their traditional approaches and still apply the concepts of preamble extension as described herein. The preamble message extension bits of extension 234 can be considered a request for additional bandwidth. The request can be considered to be a "Fast Access Request," which includes information in the preamble message to inform a decision by the access point on a bandwidth allocation assignment. Extension 234 can include 1 to N bits, and in one embodiment represents a mapping of the initial bandwidth request for UE 210.

RA request 230 is received at access point 240, which processes the request, and makes a resource allocation in response to the request. Access point 240 includes access processor 242, which represents processors and components that receive and service/process access request messages. Access processor 242 identifies extension 234 of RA request 230. In one embodiment, access point 240 includes LUT (lookup table) 250, which provides a mapping of extension bits to resource allocation assignment suggestions. LUT 250 includes keys 252, 254, and 256 with associated assignments (asgt) 262, 264, and 266, respectively. Note that LUT 250 may contain any number of keys and assignments, and three are shown solely for purposes of illustrating the concept. Access processor 242 can use the bits from extension 234 to search keys 252-256, which will then indicate an assignment associated with the extension request.

In one embodiment, the system does not have enough available bandwidth to allocate the suggested assignment of LUT 250. Thus, a lower assignment may be granted in response to the request. Otherwise, the system may grant the suggested amount of additional bandwidth in response to the request. The allocation is indicated to UE 210 via allocation assignment message 270. In response to the allocation assignment message, UE 210 can determine whether additional bandwidth is allocated for transmitting data with the scheduling message, and if so, how much. Assuming additional bandwidth is allocated, UE 210 transmits scheduling request 280 with data.

FIG. 3 is a block diagram of an embodiment of a scheduling resource allocation lookup table. LUT 300 includes information that may be present in a LUT implemented in a system as described herein. Other information is provided by way of example and explanation, and may or may not be present in a specific LUT implementation. As illustrated, LUT 300 includes columns of information extension request (ext rqst) 310, bytes 320, class 330, example 340, and characteristic 350.

Extension request 310 provides an example bit mapping for a fast access request, assuming two bits in the extension. A '11' may map to conversational class 332, which is real-time. Such a request may be associated with a request for 512 additional bytes 320. Note that in the embodiment shown, a byte allocation is associated with a class type. However, a byte allocation can be requested independently of indicating class type (e.g., requesting a certain number of bytes with a bit mapping). A '10' may map to streaming (real-time) class 334, with an associated additional 80 bytes. A '01' may map to interactive (best efforts) class 336, with an associated additional 20 bytes. A '00' may map to background (best efforts) class 338, with no additional bytes.

Example 340 would not normally be in an implemented LUT, but is illustrative of the type of traffic referred to by class 330. For example, voice 342 is an example of conversational class 332, streaming video 344 is an example of streaming class 334, web browsing is an example of interactive class 336, and background email download 348 is an example of background class 338. More general characteristics of each example class are provided in characteristic 350. In an actual implementation, characteristic 350, if included in LUT 300, would likely not include a long string of information or explanations; rather, characteristic 350 may include a configuration mask that could indicate different types of processing to use, or other information relative to the class.

As illustrated, the general approach to conversational class 332 is to preserve time relations between entities. Voice is generally conversational with stringent timing and low delays allowed, according to the implementation shown. The general approach to streaming class 334 is to preserve time relation between entities. The general approach to interactive class 336 is to request a response pattern and preserve payload content. The general approach to background class 338 is to preserve payload content; there is no expectation with respect to timing. It will be understood that the above mapping is merely representative, and any number of other combinations can be provided.

As mentioned above, if there are insufficient resources available to allocate the requested extended scheduling resources, in one embodiment, the base station allocates what is available. For example, suppose a UE indicates streaming traffic, and thus requests 80 bytes. If the 80 bytes are not available, but 20 bytes are available, the base station may respond by providing an allocation for 20 bytes. Alternatively, the base station could delay responding to the request until 80 bytes are available. Alternatively, a lower number of bytes could be allocated that is lower than the number of bytes requested, but not necessarily a number associated with a lower level of service (for example, if 80 bytes were requested and 60 bytes were allocated).

FIG. 4 is a flow diagram of an embodiment of a process for providing additional resources during a scheduling procedure in response to a random access request having an extension that indicates a request for the additional resources. A flow diagram as illustrated herein provides examples of sequences of various process actions. Although shown in a particular sequence or order, unless otherwise specified, the order of the actions can be modified. Thus, the illustrated implementations should be understood only as examples, and the process can be performed in a different order, and some actions may be performed in parallel. Additionally, one or more actions can be omitted in various embodiments of the invention; thus, not all actions are required in every implementation. Other process flows are possible.

Figure 4A:
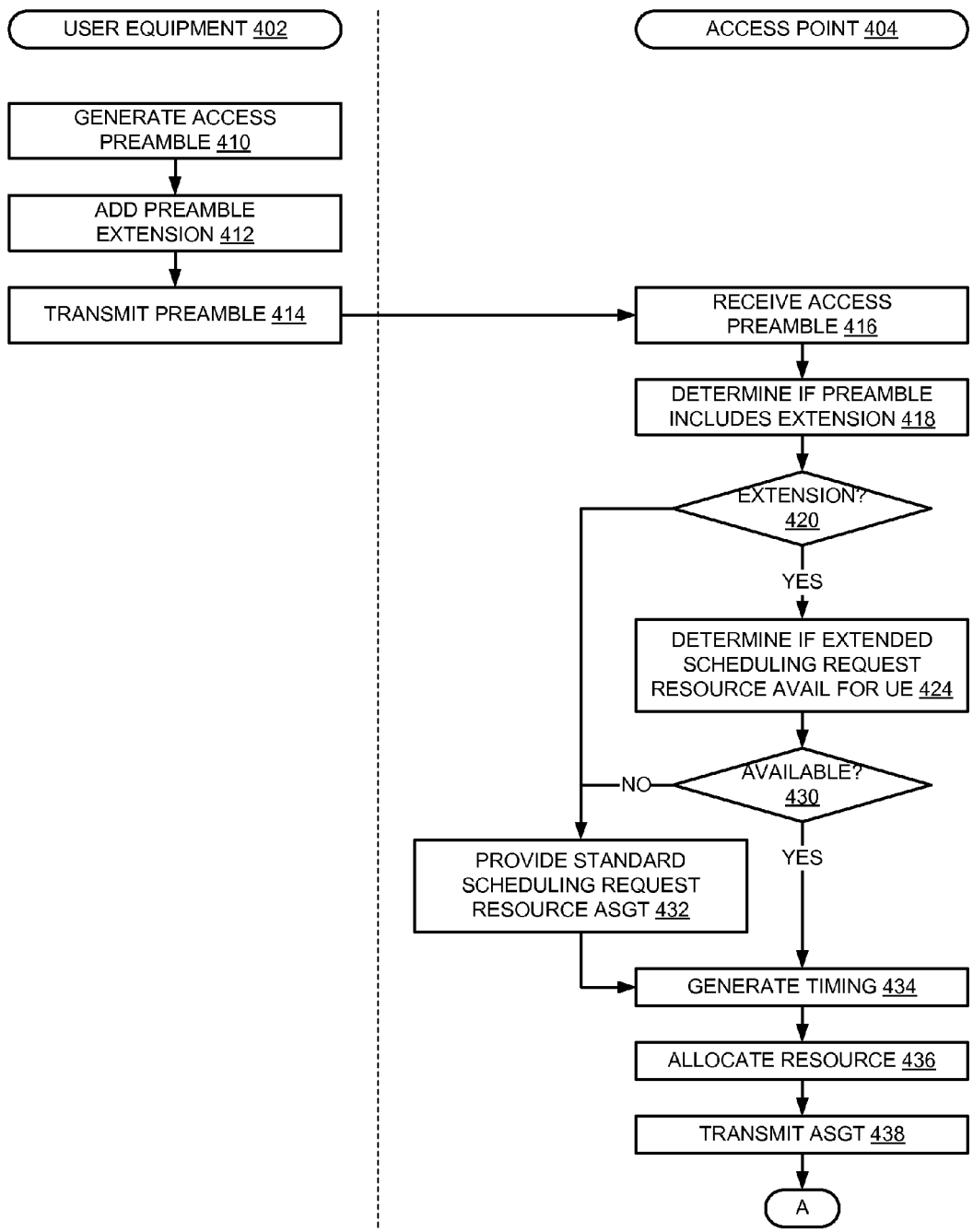
FIG. 4 is a flow diagram of an embodiment of a process for providing additional resources during a scheduling procedure in response to a random access request having an extension that indicates a request for the additional resources.

FIG. 4A illustrates a message exchange between UE 402 and access point 404. UE 402 generates an access preamble to send with an access request, 410. The UE adds a preamble extension to request additional scheduling resources, 412. The preamble extension can be an indication of traffic type of traffic priority, and/or an indication of how many bytes of additional bandwidth are requested. The UE transmits the preamble with the access request, 414.

The access point receives the access request preamble, 416, and processes the preamble. In one embodiment, the access point determines if the preamble includes an extension, or requests via the extension additional resources, 418. If a fast access request is requested via a preamble extension, 420, the access point determines if resources are available to service the extended scheduling request, 424. If the extended scheduling resources are not available, 430, or if there is no fast access request extension, 420, the access point assigns standard scheduling request resources to the UE, 432. The standard scheduling request resources refers to whatever resources are configured in the system for use by a UE.

After indicating a standard resource allocation, 432, or determining to use an extended resource allocation, 430, the access point generates timing information, 434. The timing information indicates the access configuration to the UE. The access point also allocates the resource(s) to the UE, 436. Allocating the resource may include assigning the UE in an assignment table within the scheduler and generating a message having the assignment for the UE. A resource allocation message having the resource assignment and the timing information is transmitted to the UE, 438.

Figure 4B:
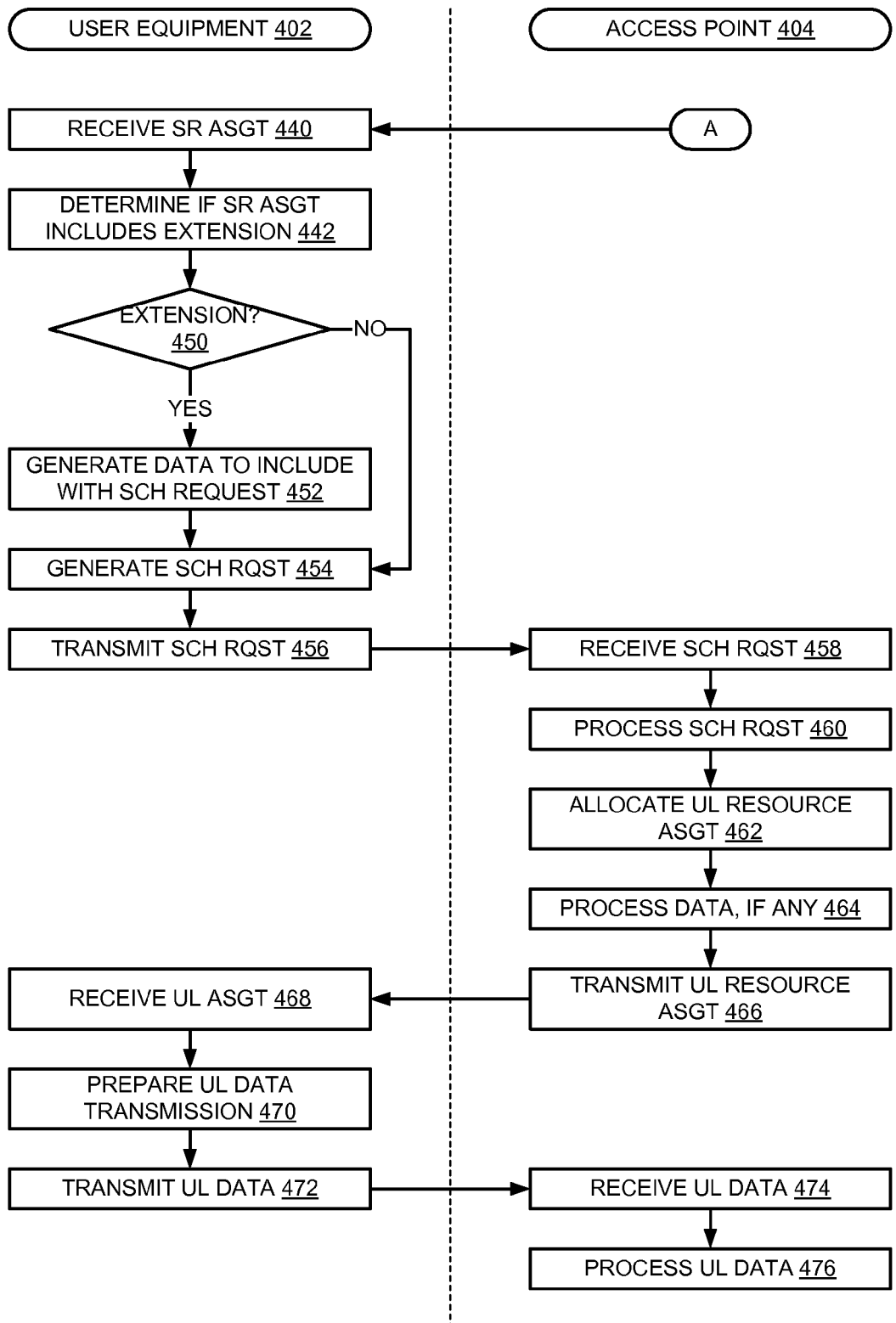

Continuing to FIG. 4B, the UE receives the scheduling resource (SR) assignment, 440, and determines if the scheduling resource assignment includes extended bandwidth, 442. If no bandwidth extension is provided, 450, the UE generates the scheduling request (sch rqst), 454, without data to transmit. If the resource assignment includes an extension of bandwidth, 450, the UE generates data to include with the scheduling request, 452. The UE then generates the scheduling request, 454, and generates a scheduling request message with combined data (if appropriate). The scheduling request message is transmitted to the access point, 456.

The access point receives the scheduling request message, 458, and processes the scheduling request, 460. In response to the scheduling request, the access point may allocate a UL resource assignment for the UE, 462. Note that in one embodiment, the UE will not include a scheduling request in the scheduling request message, because the entire message may be contained within the additional bandwidth allocated. Thus, the UL resource is assigned as needed. Additionally, there may or may not be data sent with the scheduling request. If there is data sent with the request, the access point processes the data, 464.

The access point can then provide the UL resource assignment, assuming there is one, 466. The UE receives the UL assignment, 468, and prepares UL data for transmission, 470. Assuming additional data to transmit to the base station, the UE transmits the UL data, 472, in accordance with the UL assignment. The base station receives the UL data, 474, and processes the UL data, 476. Such can continue until the UE has no more data to transmit.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
generating at a client device an access request message having an access request preamble with a preamble extension of at least one bit indicating a request for an allocation of additional bandwidth for a scheduling procedure, the access request message further having message data separate from the preamble and the preamble extension;
transmitting the access request message to a wireless access point to request the additional bandwidth, the wireless access point to include a preamble processing module capable of processing access request preambles with preamble extensions and access request preambles without preamble extensions;
receiving a scheduling resource assignment from the wireless access point, the scheduling resource assignment to include an assignment for an amount of additional bandwidth; and
transmitting a scheduling request to the wireless access point in response to receiving the scheduling resource assignment, the scheduling request to include data utilizing the amount of additional bandwidth assigned by the scheduling resource assignment.

2. The method of claim 1, wherein generating the access request message with the preamble with the extension further comprises:
including traffic class information in the preamble.

3. The method of claim 2, the traffic class information to indicate type of traffic and level of service to be used to process the traffic.

4. The method of claim 1, wherein generating the access request message with the preamble with the extension further comprises:
including priority information in the preamble.

5. The method of claim 1, wherein generating the access request message with the preamble with the extension further comprises:
including quality of service information in the preamble.

6. The method of claim 1, wherein the preamble extension comprises bits that map to a lookup table of bandwidth allocation amounts.

7. The method of claim 6, wherein the number of bits is two.

8. An article of manufacture comprising a non-transitory machine readable storage medium having content stored thereon to provide instructions to cause a machine to perform operations, including:

generating at a client device an access request message having an access request preamble with a preamble extension of at least one bit indicating a request for an allocation of additional bandwidth for a scheduling procedure, the access request message further having message data separate from the preamble and the preamble extension;

transmitting the access request message to a wireless access point to request the additional bandwidth, the wireless access point to include a preamble processing module capable of processing access request preambles with preamble extensions and access request preambles without preamble extensions;

receiving a scheduling resource assignment from the wireless access point, the scheduling resource assignment to include an assignment for an amount of additional bandwidth; and transmitting a scheduling request to the wireless access point in response to receiving the scheduling resource assignment, the scheduling request to include data utilizing the amount of additional bandwidth assigned by the scheduling resource assignment.

9. The article of manufacture of claim 8, wherein the content to provide instructions for generating the access request message with the preamble with the extension further comprises content to provide instructions for including traffic class information in the preamble.

10. The article of manufacture of claim 9, the traffic class information to indicate type of traffic and level of service to be used to process the traffic.

11. The article of manufacture of claim 8, wherein the preamble extension comprises two bits that map to a lookup table of four bandwidth allocation levels, each level corresponding to a traffic class.

12. A user device comprising:
a message processor to generate a random access request message, the random access message to include a preamble;
a preamble generator coupled to the message processor to generate the preamble for the random access request message, the preamble including a preamble extension of at least one bit indicating a request for an allocation of additional bandwidth for a scheduling procedure, the access request message further having message data separate from the preamble and the preamble extension;
an uplink transmission path to transmit the random access request message to an access point to request allocation of an extended scheduling resource, the access point to include a preamble processing module capable of processing access request preambles with preamble extensions and access request preambles without preamble extensions;
a downlink transmission path to receive a scheduling resource assignment from the access point, the scheduling resource assignment to include an assignment for an amount of additional bandwidth; and
a scheduling request generator to generate a scheduling request in response to the downlink transmission path receiving the scheduling resource assignment, the scheduling request to include data utilizing the amount of additional bandwidth assigned by the scheduling resource assignment and to be transmitted via the uplink transmission path.

13. The user device of claim 12, wherein the preamble generator is further to determine a traffic class of a message to be sent to the access point, the preamble extension to indicate the determined traffic class of the message.

14. The user device of claim 13, wherein the preamble generator includes the preamble extension with bits to indicate a traffic class of the message in accordance with the Universal Mobile Telecommunication System traffic class definition.

15. The user device of claim 13, the traffic class information to indicate type of traffic and level of service to be used to process the traffic.

16. A method comprising:
receiving from a user device an access request that includes an access request preamble;
determining whether the access request preamble includes an extension of at least one bit indicating a request for an allocation of a first amount of additional bandwidth for a scheduling procedure; and
in response to determining the access request preamble includes an extension
determining whether the first amount of additional bandwidth is available;
allocating a resource with the first amount of additional bandwidth requested in response to receiving the request and determining that the first amount of additional bandwidth is available;
allocating a resource with a second amount of additional bandwidth in response to receiving the request and determining that the first amount of additional bandwidth requested is not available, wherein the second amount is less than the first amount;
transmitting an indication of the allocated resource to the user device with a synchronization message; and
receiving a scheduling request from the user device, the scheduling request to include data utilizing the respective amount of additional bandwidth allocated.

17. The method of claim 16, wherein identifying the resource comprises:
accessing a lookup table to identify the first amount of additional bandwidth to allocate, where the extension mapping to a particular entry in the lookup table.

18. The method of claim 16, wherein receiving the access request with the preamble extension comprises:
receiving the access request with an indication of one or more of traffic class, priority, or quality of service information for a message to be sent by the user device.

19. The method of claim 18, the traffic class information to indicate type of traffic and level of service to be used to process the traffic.

* * * * *